US008516217B2

(12) United States Patent
Logan et al.

(10) Patent No.: US 8,516,217 B2
(45) Date of Patent: Aug. 20, 2013

(54) MANAGING A LOGICALLY PARTITIONED COMPUTING SYSTEM THROUGH A VIRTUAL FILE SYSTEM

(75) Inventors: Bryan M. Logan, Rochester, MN (US); Nicholas J. Rogness, Rochester, MN (US); Steven E. Royer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1149 days.

(21) Appl. No.: 12/412,634

(22) Filed: Mar. 27, 2009

(65) Prior Publication Data

US 2010/0250892 A1 Sep. 30, 2010

(51) Int. Cl.
*G06F 12/02* (2006.01)
(52) U.S. Cl.
USPC ........... 711/173; 709/226; 711/154; 711/170; 715/735; 715/771; 718/104
(58) Field of Classification Search
USPC ................. 715/733–747, 771, 965–966, 970; 718/104; 709/223–226; 711/154, 170, 173
See application file for complete search history.

(56) References Cited

U.S. PATENT DOCUMENTS

| | | | | |
|---|---|---|---|---|
| 5,986,653 A * | 11/1999 | Phathayakorn et al. | ...... | 715/835 |
| 6,690,400 B1 * | 2/2004 | Moayyad et al. | ............. | 345/779 |
| 7,546,394 B1 * | 6/2009 | Jacobson et al. | ................. | 710/23 |
| 2003/0225796 A1 * | 12/2003 | Matsubara | ..................... | 707/200 |
| 2004/0021678 A1 * | 2/2004 | Ullah et al. | .................... | 345/700 |
| 2004/0091175 A1 * | 5/2004 | Beyrouti | ........................ | 382/305 |
| 2005/0283784 A1 * | 12/2005 | Suzuki | .......................... | 718/100 |
| 2008/0250222 A1 * | 10/2008 | Gokhale et al. | ............... | 711/203 |

OTHER PUBLICATIONS

Wikipedia contributors. "Device file." Wikipedia, The Free Encyclopedia. Wikipedia, The Free Encyclopedia, Mar. 27, 2013. Web. Retrieved Apr. 1, 2013.*

\* cited by examiner

*Primary Examiner* — Christian P Chase
*Assistant Examiner* — Nicholas Simonetti
(74) *Attorney, Agent, or Firm* — Wood, Herron & Evans LLP (57) ABSTRACT

A method, apparatus, and program product for managing partitionable resources in a logically partitioned computing system is disclosed. The method includes associating each of a plurality of partitionable resources in the logically partitioned computing system with a respective file entry in a virtual file system, associating each of a plurality of partitionable resources in the logically partitioned computing system with a respective file entry in a virtual file system, and allocating a first partitionable resource among the plurality of partitionable resources to a first logical partition among the plurality of logical partitions in response to a file system operation directed to the virtual file system to organize a respective file entry for the first partitionable resource within the respective directory for the first logical partition.

24 Claims, 8 Drawing Sheets

MANAGING A LOGICALLY PARTITIONED COMPUTING SYSTEM THROUGH A VIRTUAL FILE SYSTEM

FIELD OF THE INVENTION

The present invention relates to computing systems, and more particularly to the management of logically partitioned computers.

BACKGROUND OF THE INVENTION

Modern requirements for a computer system may require that a computer be utilized to run several operating environments, or operating systems, at once. In a typical embodiment, a single logically partitioned computer can run a plurality of operating systems in a corresponding plurality of logical partitions. Each operating system resides in its own logical partition, with each logical partition allocated a part of a processor, an entire processor, or multiple processors from the computer. Additionally, a portion of the computer's memory is allocated to each logical partition. All of the logical partitions are under the control of a partition manager. The partition manager is typically a part of the system firmware and manages the allocation of resources to the operating systems and logical partitions. As such, one logically partitioned computer may run one or more logical partitions and thus virtualize the operations of the applications, operating system, and other program code configured to operate in those logical partitions.

Logical partitions are typically configured by an information technology ("IT") professional that has authority to access the partition manager and configure each logical partition. Logical partitions may also be configured by the manufacturer of the computer. For example, in a typical configuration, the resources of the computer (i.e., processors, memory, I/O devices) are spread evenly amongst each logical partition. For example, if the computer has eight processors with four processor cores (i.e., the computer is a 32-way system), the computer may be configured with sixteen logical partitions utilizing two processor cores each. In this way, an operating system configured on a logical partition views the logical partition as a two-way computer system (i.e., each computer system having two processors). Similarly, the computer may be configured with eight logical partitions utilizing one processor (i.e., the logical partition utilizes four processor cores). In this way, an operating system configured on the logical partition views the logical partition as a four-way computer (i.e., a computer having four processors).

The logical partitions configured on many conventional logically partitioned computers generally remain static after configuration, with the allocation of the resources to the logically partitioned computer often unknown to users. However, this configuration often results in an inefficient use of the resources in the computer. The needs of an operating environment (or software running on the operating environment) typically vary over time. As such, the operating environment often struggles to conform to the configured logical partitions. In the end, users are typically forced to "shoehorn" data processing into an inadequate logical partition that does not meet resource needs and whose configuration cannot be changed. The operating environment, or applications thereon, configured on that inadequate logical partition is typically starved for resources while other resources in the computer may be unused or underutilized. An operating environment starved for resources is typically associated with a loss of productivity and/or efficiency. Moreover, users are often unaware of the resource allocation to the logically partitioned computer and are typically unaware that free resources may be allocated to individual logical partitions without significantly and adversely affecting the operation of other logical partitions.

Furthermore, the problems and issues listed above are often compounded with logically partitioned computing systems that include a plurality of logically partitioned computers. For example, when it is desired to adjust the resources to one or more logically partitioned computer of a logically partitioned computing system, each adjustment to each desired logically partitioned computer may require those desired logically partitioned computers to be individually accessed by the IT professional. Moreover, resource allocation needs may change multiple times a day, and as such it is generally impossible for the IT professional to adjust the resource allocation of a logically partitioned computer and/or a logically partitioned computing system multiple times per day.

Consequently, there is a continuing need for improving the management of partitionable resources in a logically partitioned computing system so as to minimize the complexity and provide a familiar interface for resource allocation as well as display.

SUMMARY OF THE INVENTION

Embodiments of the invention provide for a method, apparatus, and program product to facilitate the management of partitionable resources in a logically partitioned computing system by representing the entities in the logically partitioned computing system with entities in a virtual file system. By doing so, the allocation of particular resources in the logically partitioned computing system to particular logical partitions can be ascertained based upon the allocation of entities representing such resources within the virtual file system. Moreover, in many instances management of the resources in the logically partitioned computing system can be handled via file system-type operations that are readily understandable by users.

Consistent with one aspect of the invention, each of a plurality of partitionable resources in the logically partitioned computing system is associated with a respective file entry in a virtual file system, and each of a plurality of logical partitions in the logically partitioned computing system is associated with a respective directory in the virtual file system. By doing so, a partitionable resource may be allocated to a logical partition in response to a file system operation directed to the virtual file system to organize a respective file entry for the partitionable resource within the respective directory for the logical partition.

In some embodiments, a method consistent with the invention includes selectively controlling access to the directory for a logical partition with an access control list associated with the directory for the logical partition, while in alternative embodiments a method consistent with the invention includes selectively controlling access to operations on the directory for a logical partition with an access control list associated with the directory for the logical partition. In some embodiments, file system operations may be translated into partition management commands configured to be executed by a virtualization manager for a first logical partition.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

DETAILED DESCRIPTION

Embodiments of the invention provide a method, apparatus, and program product to manage partitionable resources in a logically partitioned computing system.

With logical partitioning and other virtualization techniques becoming more common, it may be desirable to provide a way for users that may not be professional computer administrators to manage their logically partitioned computing system. Embodiments of the invention provide an existing interface that may be familiar to those users in order to allow management of a logically partitioned computing system. In some embodiments, embodiments of the invention provide a virtual file system to allow users to manage the logical partitions of a logically partitioned computing system, as well as the partitionable resources of that logically partitioned computing system (e.g., input/output devices, processors, memory, etc.), in a conceptually similar manner to the way that files and other file system entities are conventionally managed in a file system. As such, resources of the logically partitioned computing system are associated with file entries in the virtual file system, while logical partitions of the logically partitioned computing system are associated with directories. The file entries of the resources are allocated to the directories of the logical partitions in a corresponding manner as are the actual resources allocated to the logical partitions. File entries of free resources may be allocated to a free resource directory. The virtual file system may be maintained by a configuration manager, such as a hardware management console, and interfaced through a file browser, command prompt, or application that may be familiar to the user. The user may access the virtual file system through the Network File System (NFS) protocol. Thus, the user may adjust the resource allocation of the logically partitioned computing system by adjusting the allocation of file entries to the logical partition directories through file system operations, or commands, on the virtual file system. The configuration manager may translate those file system operations to partition management commands, and the configuration manager may forward those partition management commands to a virtualization manager to adjust the allocation of physical resources to the logical partitions of the logically partitioned computing system.

Thus, embodiments consistent with the invention provide a method, apparatus, and program product to manage partitionable resources in a logically partitioned computing system. The method includes associating each of a plurality of partitionable resources in the logically partitioned computing system with a respective file entry in a virtual file system, and associating each of a plurality of logical partitions in the logically partitioned computing system with a respective directory in the virtual file system. The method further includes allocating a first partitionable resource among the plurality of partitionable resources to a first logical partition among the plurality of logical partitions in response to a file system operation directed to the virtual file system to organize a respective file entry for the first partitionable resource within the respective directory for the first logical partition.

In some embodiments, the method includes selectively controlling access to the directory for the first logical partition with an access control list associated with the directory for the first logical partition. In those embodiments, selectively controlling access to the directory for the first logical partition includes determining the identity of a user attempting to access the directory for the first logical partition and determining whether the user has access to the directory for the first logical partition based on the access control list. In alternative embodiments, the method includes selectively controlling access to operations on the directory for the first logical partition with an access control list associated with the directory for the first logical partition. In those alternative embodiments, selectively controlling access to operations on the directory for the first logical partition includes determining the identity of a user attempting to perform an operation on the directory for the first logical partition and determining whether the user has access to perform the operation on the directory for the first logical partition based on the access control list.

In some embodiments, the file system operation is at least one operation selected from the group consisting of a drag and drop operation, a cut and paste operation, an operation entered in a command prompt, an operation from an application, or combinations thereof. In other embodiments, the method includes translating the file system operation into at least one partition management command configured to be executed by a virtualization manager for the first logical partition. Moreover, in still other embodiments, the method includes archiving at least a portion of a configuration of the plurality of logical partitions in the logically partitioned computing system. This archiving includes copying at least the directory for the first logical partition from the virtual file system and storing said copy.

In some embodiments, the method includes generating the virtual file system in response to a mount command for at least one logical partition among the plurality of logical partitions and generating at least one directory for the file entries of the plurality of partitionable resources in response to generating the virtual file system. In other embodiments, the method includes generating the directory for the first logical partition in the virtual file system for the logically partitioned computing system in response to a mount command for the first logical partition. In those embodiments, the method includes generating at least one virtual resource file entry in response to the creation of the directory for the first logical partition and allocating the at least one virtual resource file entry to the directory for the first logical partition.

In some embodiments, the method further includes allocating a first partitionable resource among the plurality of partitionable resources to the directory for the first logical partition. In those embodiments, the method may include allocating a respective file entry for the first partitionable resource to the respective directory for the first logical partition. However, the method may further include allocating a free partitionable resource among the plurality of partitionable resources to a free partitionable resource pool of the logically partitioned computing system, and in those embodiments the method may include allocating a respective file entry for the free partitionable resource to a respective directory for free partitionable resources. As such, the first partitionable resource may be a free partitionable resource and the file system operation directed to the virtual file system to organize the file entry for the first partitionable resource within the directory for the first logical partition may include transferring the file entry for the first partitionable resource from the directory for partitionable resources to the directory for the first logical partition.

In addition, in some embodiments, the virtual file system is provided to a first computing system in communication with the logically partitioned computing system to manage the partitionable resources of the logically partitioned computing system.

Hardware and Software Environment

Figure 1:
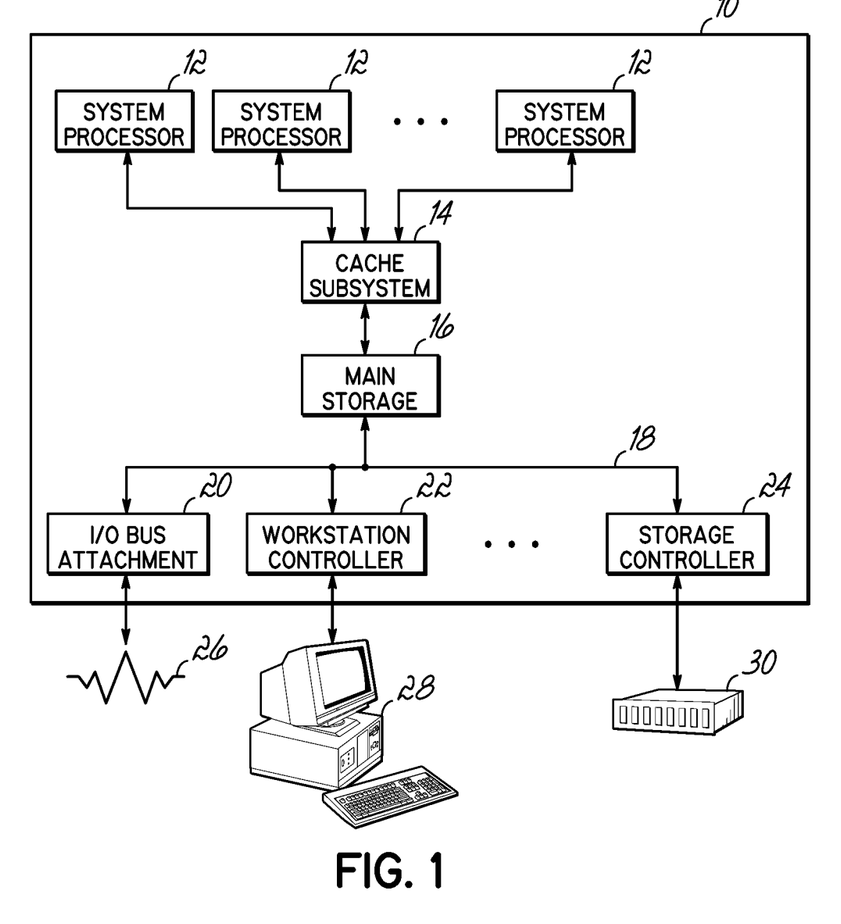
FIG. 1 is a diagrammatic illustration of a computing system configured to accomplish the management of partitionable resources of a logically partitioned computing system consistent with embodiments of the invention.

Turning more particularly to the drawings, wherein like numbers denote like parts through the several views, FIG. 1 generally illustrates a data processing apparatus 10 consistent with the invention. Apparatus 10, in specific embodiments, may be a computer, computer system, computing device, server, disk array, or programmable device such as a multi-user computer, a single-user computer, a handheld device, a networked device (including a computer in a cluster configuration), a mobile phone, a video game console (or other gaming system), etc. Apparatus 10 may be referred to as "logically partitioned computing system" or "computing system," but will be referred to as "computer" for the sake of brevity. One suitable implementation of computer 10 may be a multi-user computer, such as a computer available from International Business Machines Corporation (IBM).

Computer 10 generally includes one or more physical processors ("processors") 12 coupled to a memory subsystem including main storage 16, e.g., an array of random access memory (RAM). Main storage 16 may be comprised of dynamic random access memory (DRAM), static random access memory (SRAM), flash memory, hard disk drive, and/or another digital storage medium. Where desired, the processors 12 may be multithreaded and/or have multiple cores. Also illustrated as interposed between processors 12 and main storage 16 is a cache subsystem 14, typically including one or more levels of data, instruction and/or combination caches, with certain caches either serving individual processors or multiple processors as is well known in the art.

Main storage 16 may be coupled to a number of external input/output (I/O) devices via a system bus 18 and a plurality of interface devices, e.g., an I/O bus attachment interface 20, a workstation controller 22, and/or a storage controller 24, which respectively provide external access to one or more external networks 26, one or more workstations 28, and/or one or more storage devices such as a direct access storage device (DASD) 30. System bus 18 may also be coupled to a user input (not shown) operable by a user of computer 10 to enter data (i.e., the user input may include a mouse, a keyboard, etc.) and a display (not shown) operable to display data from the computer 10 (i.e., the display may be a CRT monitor, an LCD display panel, etc.). Computer 10 may also be configured as a member of a distributed computing environment and communicate with other members of that distributed computing environment through network 26.

Figure 2:
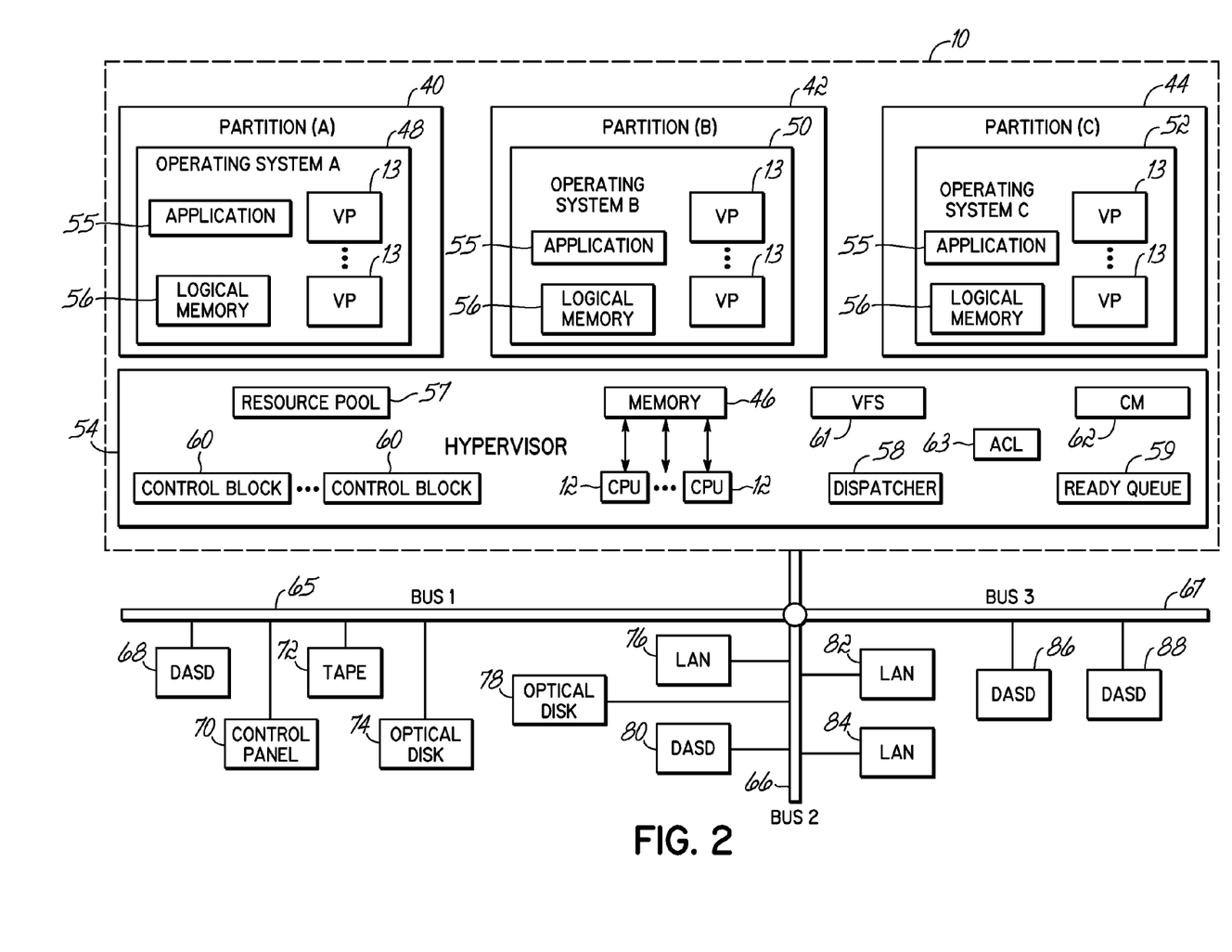
FIG. 2 is a diagrammatic illustration of the primary software components and resources of the computing system of FIG. 1.

FIG. 2 illustrates in greater detail the primary software components and resources used to implement a logically partitioned environment consistent with embodiments of the invention. FIG. 2 generally shows a logically partitioned computing system characterized as a virtual machine design as developed by IBM. In particular, FIG. 2 may illustrate an architecture of one of the embodiments of the computer 10. The computer 10 includes a plurality of partitions, e.g., partitions 40, 42 and 44, that share common processing resources. The logically partitioned computing system architecture may rely upon a single computing machine having one or more processors 12, or central processing units (as shown in FIG. 2, each processor 12 is designated "CPU"), coupled with a system memory 46. The system memory 46 may be incorporated into the cache subsystem 14, main storage 16, or DASD 30 illustrated in FIG. 1, or a separate memory. Referring back to FIG. 2, the processors 12 may execute software configured to simulate one or more virtual processors 13 in each partition 40, 42 and/or 44.

The partitions 40, 42, 44 may logically comprise a portion of the processors 12, memory 46, and/or other resources of the computer 10. Each partition 40, 42, 44 typically hosts a respective operating environment, or operating system 48, 50, 52. After being configured with resources and operating systems 48, 50, 52, each partition 40, 42, 44 generally operates as if it were a separate computer.

An underlying program, called a partition manager, a virtualization manager, or more commonly a "hypervisor" 54, may be operable to assign and adjust resources to each partition 40, 42, 44. For instance, the hypervisor 54 may intercept requests for resources from operating systems 48, 50, 52 or applications configured thereon in order to globally share and allocate the resources of computer 10. For example, when the partitions 40, 42, 44 within computer 10 are sharing processors 12, the hypervisor 54 may allocate physical processor cycles between the virtual processors 13 of the partitions 40, 42, 44 sharing the processors 12. The hypervisor 54 may also share other resources of computer 10. Other resources of computer 10 that may be shared include the memory 46, other components of the computer 10, other devices connected to the computer 10, and other devices in communication with computer 10. Although not shown, one having ordinary skill in the art will appreciate that the hypervisor 54 may include its own firmware and compatibility table as is well known in the art. For purposes of this specification, a partition 40, 42, 44 may use either or both the firmware of the partition 40, 42, 44 and hypervisor 54.

The hypervisor 54 creates, adds, or adjusts physical resources utilized by logical partitions 40, 42, 44 by adding or removing virtual resources from one or more of the logical partitions 40, 42, 44. For example, the hypervisor 54 controls the visibility of the physical processors 12 to each partition 40, 42, 44, aligning the visibility of the one or more virtual processors 13 to act as customized processors (i.e., the one or more virtual processors 13 may be configured with a different amount of resources than the physical processors 12). Similarly, the hypervisor 54 may create, add, or adjust other virtual resources that align the visibility of other physical resources of computer 10.

Each operating system 48, 50, 52 controls the primary operations of its respective logical partition 40, 42, 44 in a manner similar to the operating system of a non-partitioned computer. For example, each logical partition 40, 42, 44 may be a member of the same, or a different, distributed computing environment. As illustrated in FIG. 2, the operating system 48, 50 and/or 52 includes application 55. In one embodiment, application 55 is a "middleware" application that connects applications, processes, and/or software components. In the illustrated embodiment, application 55 may consist of a set of enabling services that allow multiple processes running on one or more logical partitions of one or more computers to interact. As such, application 55 may be a distributed application configured across multiple logical partitions (i.e., as shown in FIG. 2, across logical partitions 40, 42 and 44) of one or more computers (i.e., as shown in FIG. 2, application is configured across computer 10) as part of a distributed computing environment. One such distributed computing environment is a WebSphere architecture, as developed by IBM of Armonk, N.Y., such that a business may set up, operate, and integrate network-based websites, applications, or businesses across one or more computing systems.

Each operating system 48, 50, 52 may execute in a separate memory space, represented by logical memory 56. For example and as discussed herein, each logical partition 40, 42, 44 may share the processors 12 by sharing a percentage of processor resources as well as a portion of the available memory 46 for use in logical memory 56. In this manner, the resources of a given processor 12 may be utilized by more than one logical partition 40, 42 and/or 44. In similar manners, the other resources available to computer 10 may be utilized by more than one logical partition 40, 42, 44.

When resources of the computer 10 are not being utilized, the hypervisor 54 may track the free resources in one or more resource pools 57. A pool 57 may include a list of resources of the computer 10 (i.e., CPU's 12, memory 46, etc.) that are available for performing a task, available for processing data, available for access, or otherwise available to be allocated to a logical partitions 40, 42, 44.

The hypervisor 54 may include a dispatcher 58 that manages the dispatching of virtual resources to physical resources on a dispatch list, or ready queue 59. The ready queue 59 comprises memory that includes a list of virtual resources having work that is waiting to be dispatched to a resource of computer 10. As shown in FIG. 2, the hypervisor 54 includes processors 12 and processor control blocks 60. The processor control blocks 60 interface with the ready queue 59 and comprise memory that includes a list of virtual processors 13 waiting for access on a respective processor 12. Although FIG. 2 illustrates at least one processor control block 60 for each processor 12, one skilled in the art will appreciate that the hypervisor 54 may be configured with more or less processor control blocks 60 than there are processors 12.

The computer 10 may be configured with a virtual file system 61 to display a representation of the allocation of physical resources to the logical partitions 40, 42 and/or 44. The virtual file system 61 may include a plurality of file entries associated with respective portion of physical resources of the computer 10 disposed in at least one directory associated with at least one logical partition 40, 42, 44. As such, the virtual file system 61 may display the file entries in the respective directories in a manner that corresponds to the allocation of resources to the logical partitions 40, 42, 44. Moreover, the virtual file system 61 may include at least one virtual file entry associated with a respective virtual resource of at least one logical partition 40, 42, 44. Advantageously, a user may interface with the virtual file system 61 to adjust the allocation of resources to the logical partitions 40, 42 and/or 44 of the computer 10 by adjusting the allocation of the file entries among the directories of the virtual file system 61. As such, the computer 10 may include a configuration manager 62 (illustrated as, and hereinafter, "CM" 62), such as a hardware management console, in communication with the virtual file system 61 and responsive to the interaction with the virtual file system 61 allocate the physical resources of the computer 10.

In specific embodiments, the CM 62 is in communication with a hypervisor 54 that controls the logical partitions 40, 42, 44 such that the CM 62 may translate file system operations performed on the virtual file system 61 into partition management commands operable to be executed by the hypervisor to adjust the allocation of resources of the computer 10. In specific embodiments, the hypervisor 54 is responsive to these partition management commands to configure the computer 10 appropriately. As such, the hypervisor 54 may be responsive to the configuration of file entries in folders of the virtual file system 61 to allocate resources to the logical partitions 40, 42, 44. Although the CM 62 is shown as an incorporated code within the hypervisor 54, it will be appreciated that the CM 62 may be incorporated as a separate component. Moreover, the CM 62 may reside elsewhere within computer 10, including in one of the partitions 40, 42, 44 and/or in a separate partition (not shown). Additionally, and although not illustrated, in specific embodiments the virtual file system 61 is incorporated with the CM 62. In those embodiments, the virtual file system may be a specific file system type configured to be shared through the network file system protocol such that the virtual file system may be accessed without additional hardware and/or software components.

In some embodiments, the CM 62 tracks the resource utilization of the computer 10 by analyzing the resource pool 57, dispatcher 58, ready queue 59, control blocks 60 and/or any other table or information. The CM 62 may thus update the virtual file system 61 to display the current allocation of resources of the computer 10, including an indication of free resources that may be allocated. In specific embodiments, the virtual file system 61 is configured to communicate with at least one of a graphical user interface, a scripting language, a command prompt, an application, and/or combinations thereof through a network file system protocol to display the allocation of resources of the computer 10 as well as receive file system operations to adjust the allocation of resources of the computer 10. As such, the virtual file system 61 may be accessed by a user through a file browser and the file entries in the directories thereof may be manipulated to adjust the allocation of resources of the computer 10. As such, the virtual file system 61 may appear as a mounted or networked file system to the user through the file browser. In some embodiments, the virtual file system 61 may be dynamically provided by the CM 62 upon request from the user.

In addition to providing the interface between the virtual file system 61 and the hypervisor 54, the CM 62 may be configured to control access to the allocation of resources of the computer 10. The CM 62 may determine authority to modify the configuration of file entries in folders of the virtual file system 61, and thus to adjust the configuration of the resources of the computer 10, by analyzing access to and/or a file system operation on (e.g., a file system command on) the virtual file system 61 and comparing that access and/or operation to an access control list 63 (hereinafter, "ACL" 63). In one embodiment, the CM 62 may determine the identity of a user attempting to access a directory of the virtual file system 61 and determine whether that user is approved to do so by determining whether the user has access to the directory for based on the ACL 63. In an alternative embodiment, the CM 62 may determine the identity of a user attempting to perform an operation on a directory of the virtual file system 61 and determine whether the user has access to perform the operation on the directory based on the access control list. In further alternative embodiments, the CM 62 may translate a file system operation (e.g., an operation) into at least one partition management command, then analyze and compare that partition management command to the ACL 63 to determine whether the user has access to perform the partition management command on the computer 10.

Additional resources, e.g., mass storage, backup storage, user input, network connections, and the like, are typically allocated to the logical partitions 40, 42, 44 in a manner well known in the art. Resources can be allocated in a number of manners, e.g., on a bus-by-bus basis, or on a resource-by-resource basis, with multiple logical partitions 40, 42, 44 sharing resources on the same bus. Some resources may also be allocated to multiple logical partitions at a time. FIG. 2 illustrates, for example, three logical buses 65, 66 and 67. Bus 65 is illustrated with a plurality of resources, including a DASD 68, a control panel 70, a tape drive 72 and an optical disk drive 74; whereby all said resources may be allocated on a shared basis among logical partitions 40, 42, 44. Bus 66, on the other hand, may have resources allocated on a resource-by-resource basis, e.g., with local area network (LAN) adapter 76, optical disk drive 78 and DASD 80 allocated to logical partition 40, and LAN adapters 82 and 84 allocated to logical partition 42. Bus 67 may represent, for example, a bus allocated specifically to logical partition 44, such that all resources on the bus, e.g., DASD's 86 and 88, are allocated to the same logical partition.

Figure 3:
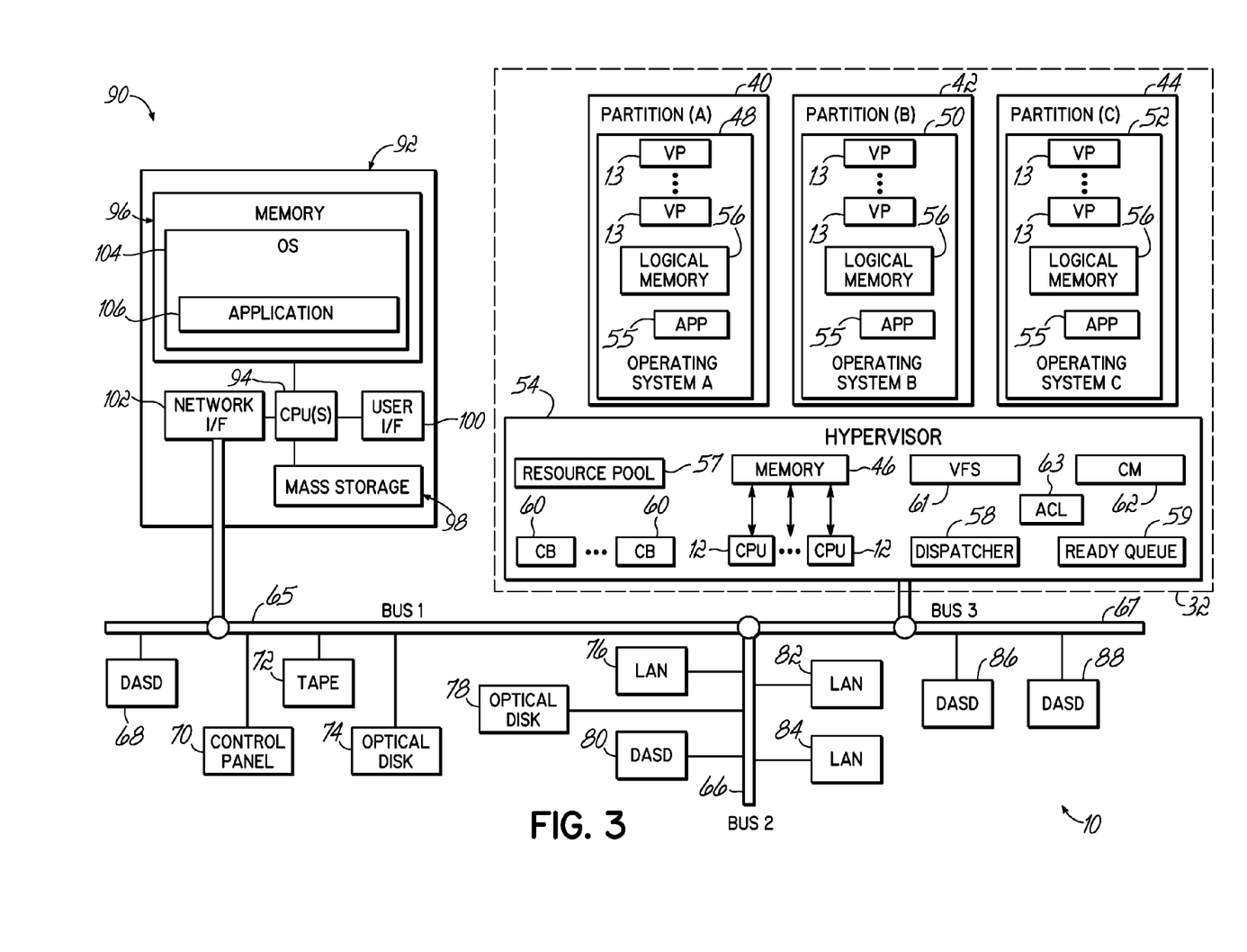
FIG. 3 is a diagrammatic illustration of an alternative embodiment of the primary software components and resources of FIG. 2 illustrating remote management of the computing system of FIG. 1 or FIG. 2.

Thus, a user may create, modify and delete logical partitions 40, 42, 44 as well as adjust the resources allocated by the computer 10 through various operations on a virtual file system 61, including operations such as drag and drop operations, cut and paste operations, command prompt operations, operations from an application, or combinations thereof. The CM 62 may in turn detect and translate that operation into at least one partition management command for the hypervisor 54 to adjust the allocation of resources of the computer 10. Thus, and in response to the at least one partition management command from the CM 62, the hypervisor 54 may create, add, and/or adjust resources utilized by logical partitions 40, 42, 44 by adding or removing virtual and/or physical resources, such as, for example, at least a portion of memory 46, at least a portion of logical memory 56, at least a portion of at least one physical processor 12, at least a portion of at least one virtual processor 13, and/or at least a portion of at least one resource in communication with computer 10 (e.g., DASD 68, 80, 86, 88, control panel 70, tape drive 72, optical disk 74, 78, and/or LAN adapter 76, 72, 74) from one or more logical partitions 40, 42, 44. Similarly, the hypervisor 54 may also create or delete one or more logical partitions 40, 42, 44 in response to at least one partition management command from the CM 62. The hypervisor 54 may then update the resource pool 57 to reflect the current availability of resources. The CM 62 may present the new allocation of resources and new free resources to the user by updating the respective virtual file system 61 directories and/or file entries FIG. 3 illustrates an alternative embodiment of a system 90 to manage the resources of a computer 10 in which the computer 10 is a first computer 10 managed across a network by a second computer 92. The second computer 92 may be a logically partitioned computing system such as computer 10 or the second computer 92 may be a conventional computer that includes one or more microprocessors 94 (illustrated as "CPU(s)" 94) coupled to a memory 96 along with several different types of peripheral devices, e.g., a mass storage device 98, a user interface 100 configured to couple to at least one user input device and/or a display (neither shown), as well as a network interface 102 coupled to logical bus 65, 66 and/or 67. In some embodiments the user input device may include a mouse, keyboard, joystick, and/or other user input device, while the display may include a liquid-crystal display, a computer monitor, or other display well known in the art. The second computer 92 may be under the control of an operating system 104 and execute or otherwise rely upon various computer software applications, components, programs, files, objects, modules, data structures, etc. (collectively, "application" 106) for performing various functions, including processing various tasks. In alternative embodiments, the second computer 92 may be in communication with computer 10 through a dedicated network (not shown) other than logical buses 65, 66, 67.

In specific embodiments, the second computer 92 is in communication with the first computer 10, and more particularly the virtual file system 61 of the first computer 10. As such, the virtual file system 61 may be provided by the CM 62 and accessed by a user of the second computer 92 through a file browser (not shown), command prompt (not shown), application 106, and/or combinations thereof of the second computer 92. Thus, the user of the second computer 92 may adjust the resources allocated to the logical partitions 40, 42, 44 of the first computer 10 through the CM 62 by adjusting the file entries of the virtual file system 61.

In some embodiments, the CM 62 is configured to manage a logically partitioned computer upon which it is not configured, but with which it is otherwise in communication. For example, the CM 62 may be in communication with at least one remote logically partitioned computer through the logical buses 65, 66, 67 and/or through another network. As such, the CM 62 may be configured to communicate with the hypervisor of that at least one remote logically partitioned computer and create a mount point on that at least one remote logically partitioned computer along with at least one option to specify that the CM 62 will be managing that at least one remote logically partitioned computer. In response, the hypervisor of that at least one remote logically partitioned computer may provide information about that at least one remote logically partitioned computer, including the allocated resources, logical partition configuration, and free resources of that at least one remote logically partitioned computer.

Although a first computer 10 and second computer 92 are illustrated in FIG. 3, the system 90 may be configured with a plurality of logically partitioned computers (not shown). As such, the second computer 92 may manage the allocation of resources to the logical partition of the plurality of logically partitioned computers, including the first computer 10, without departing from the scope of the invention.

In general, the routines executed to implement the embodiments of the invention, whether implemented as part of an operating system or a specific application, component, algorithm, program, object, module or sequence of instructions, or even a subset thereof, will be referred to herein as "computer program code" or simply "program code." Program code typically comprises one or more instructions that are resident at various times in memory and storage devices in a computer, and that, when read and executed by at least one processor in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies regardless of the particular type of computer readable media used to actually carry out the invention. Examples of computer readable media include, but are not limited to, recordable type media such as volatile and non-volatile memory devices, floppy and other removable disks, hard disk drives, tape drives, optical disks (e.g., CD-ROM's, DVD's, HD-DVD's, Blu-Ray Discs), among others, and transmission type media such as digital and analog communications links.

In addition, various program code described hereinafter may be identified based upon the application or software component within which it is implemented in specific embodiments of the invention. However, it should be appreciated that any particular program nomenclature that follows is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, Application Programming Interfaces [APIs], applications, applets, etc.), it should be appreciated that the invention is not limited to the specific organization and allocation of program functionality described herein.

Those skilled in the art will recognize that the environments illustrated in FIGS. 1-3 are not intended to limit the present invention. Indeed, those skilled in the art will recognize that other alternative hardware and/or software environments may be used without departing from the scope of the invention.

Virtual File System Hierarchy

Figure 4:
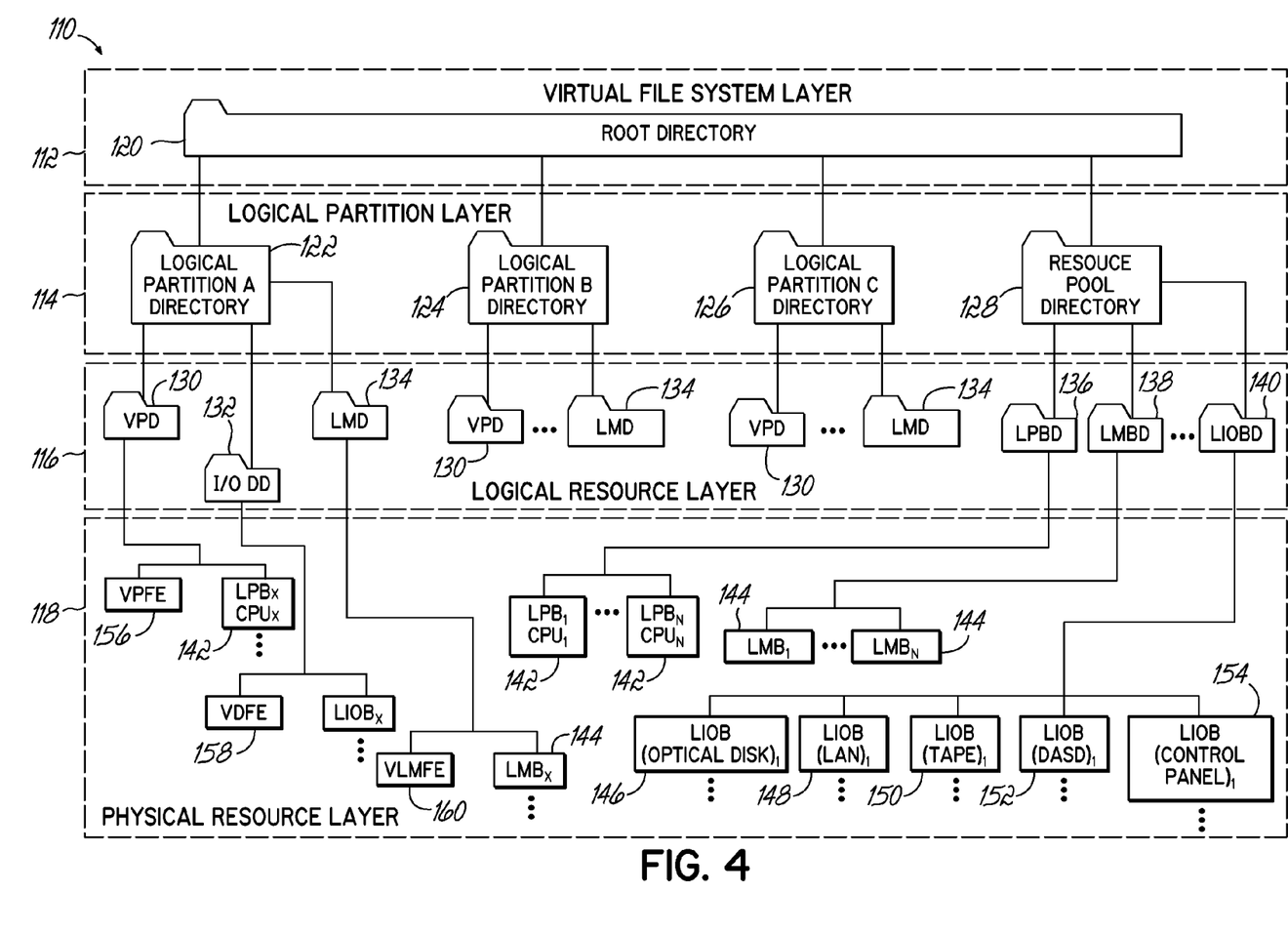
FIG. 4 is a diagrammatic illustration of the hierarchy of a virtual file system that includes a plurality of file entries and directories consistent with embodiments of the invention.

FIG. 4 illustrates a hierarchical representation 110 of a virtual file system consistent with embodiments of the invention. Each layer of the hierarchy 110 may include at least one directory, while each file entry in the respective directories may be represented as a file. In this manner, a user may interact with the layers, directories, and file entries for a virtual file system to configure the logical partitions of a logically partitioned computer with resources through a file browser either locally or remotely to that logically partitioned computer.

FIG. 4 is a hierarchical representation 110 of a virtual file system illustrating various directories and layers of that virtual file system may. In one embodiment, the virtual file system has a virtual file system layer 112, a logical partition layer 114, a logical resource directory layer 116, and/or a resource layer 118. The top layer, which may be the virtual file system layer 112, may be configured with a root directory 120 for each logically partitioned computer collected in the virtual file system. In specific embodiments, the virtual file system layer 112 includes a root directory for each logically partitioned computer managed by an CM that provides the virtual file system. As illustrated in FIG. 4, the virtual file system layer 112 includes one root directory 120, thus indicating that one logically partitioned computer is managed by the virtual file system.

The next layer of the virtual file system may be the logical partition layer 114 configured with at least one logical partition directory 122, 124, 126, and at least one resource pool directory 128. In specific embodiments, the logical partition layer 114 includes a logical partition directory 122, 124, 126 for each logical partition managed by the CM and a resource pool directory 128 for each logically partitioned computer managed by the CM. As illustrated in FIG. 4, the logical partition layer 114 is configured with three logical partition directories 122, 124, 126 to allocate the resources amongst three logical partitions. In this manner, the hierarchical representation 110 of the virtual file system may be a hierarchical representation 110 of the virtual file system for the computer 10 of FIG. 2 or FIG. 3. In addition to the logical partition directories 122, 124, 126, the logical partition layer 114 includes at least one resource pool directory 128. In specific embodiments, the resource pool directory 128 is configured to manage file entries associated with free partitionable resources of at least one logically partitioned computer.

The next layer of the virtual file system may be the logical resource directory layer 116. For each logical partition directory 122, 124, 126 in the logical partition layer 114 the logical resource directory layer 116 may include at least one virtual processor directory 130 (illustrated as "VPD" 130), at least one input/output ("I/O") device directory 132 (illustrated at "I/O DD" 142), and at least one logical memory directory 134 (illustrated as "LMD" 134). Furthermore, for each resource pool directory 128 in the logical partition layer 114 the logical resource directory layer 116 may include at least one logical processing block ("LPB") directory 136 (illustrated as "LPBD" 136), at least one logical memory block ("LMB") directory 138 (illustrated as "LMBD" 138), and/or at least one logical I/O block ("LIOB") directory 140 (illustrated as "LIOBD" 140). Each LPB directory 136 includes at least one LPB file entry 142 corresponding to at least a portion of a physical processor that may be allocated to a logical partition, and in particular at least one LPB file entry 142 that may be moved from the LPB directory 136 to a virtual processor directory 130 to allocate the at least a portion of the physical processor to a logical partition. Similarly, each LMB directory 138 includes at least one LMB file entry 144 corresponding to at least a portion of a physical memory that may be allocated to a logical partition, and in particular at least one LMB file entry 144 that may be moved from the LMB directory 138 to a logical memory directory 134 to allocate the at least a portion of the physical memory to a logical partition. Finally, each LIOB directory 140 includes at least one LIOB file entry 146-154 corresponding to at least a portion of a physical I/O device that may be allocated to a logical partition, and in particular at least one LIOB file entry 146-154 that may be moved from the LIOB directory 140 to an I/O device directory 132 to allocate the at least a portion of the physical I/O device to a logical partition.

In some embodiments, each LPB file entry 142 may be a file entry associated with a portion of a physical processor corresponding to the granular size at which that portion of a physical processor can be allocated. For example, if a processor (for example, processor 12 of computer 10) may be allocated in one-fourth increments, there may be four LPB file entries 142 configured for that processor. Also for example, if a processor may only be allocated in whole, there may be one LPB file entry 142 configured for that processor. As such, a virtual file system associated with a logically partitioned computer that includes a plurality of processors may include at least one LPB file entry 142 for each of that plurality of physical processors such that the plurality of processors may be allocated across at least one logical partition in whole or in part by configuring LPB file entries 142 across the virtual processor directories 130 of the logical partition directories 122, 124, 126.

In some embodiments, each LMB file entry 144 may be a file entry associated with a portion of physical memory corresponding to the granular size at which that portion of physical memory can be allocated. This portion of physical memory may be designated by a user, by the hypervisor of a logically partitioned computer associated with that portion of physical memory, and/or set by a manufacturer and/or distributor of the logically partitioned computer associated with that portion of physical memory. Each LIOB file entry 146-154, however, may be a file entry associated with a portion of an I/O device corresponding to the granular size at which that portion of an I/O device can be allocated. For example, FIG. 4 illustrates that the resource layer 118 includes at least one LIOB 146-154 each of a respective optical disk, LAN adapter, tape drive, DASD, and/or control panel. In specific embodiments, this indicates that the logically partitioned computer is in communication with at least one respective optical disk, LAN adapter, tape drive, DASD, and/or control panel that may be allocable in whole or in part to at least one logical partition.

As illustrated in FIG. 4, the next layer of the virtual file system may be the resource layer 118. In the resource layer 118, at least one LPB file entry 142, LMB file entry 144, and/or LIOB file entry 146-154 may be collected in their respective virtual processor directories 130, I/O device directories 132, and/or logical memory directories 134 of the logical partition directories 122, 124, and/or 126 according to their allocation to the respective logical partitions, while free LPB file entries 142, LMB file entries 144, and/or LIOB file entries 146-154 may be collected in their respective LPB directory 136, LMB directory 138, and/or LIOB directory 140 of the resource pool directory 128.

Moreover, and as illustrated in FIG. 4, each virtual processor directory 130, I/O device directories 132, and/or logical memory directories 134 may include at least one respective virtual resource file entry 156, 158 and/or 160. For example, although physical resources of a logically partitioned computer are limited (e.g., to those disposed in, or otherwise in communication with, that logically partitioned computer), virtual resources for the logical partitions are generally unlimited (although, as a practical consideration, the management of vast virtual resources may affect the performance of the logically partitioned computer disadvantageously). In some embodiments, these virtual resources appear to the logical partitions as physical resources. As such, the virtual resources may be associated with allocated physical resources and thus act to associate the physical resources of the logically partitioned computer with the logical partitions therein. As illustrated in the logical partition directory 122, the virtual processor directory 130 includes at least one virtual processor file entry 156, the I/O device directory 132 includes at least one virtual device file entry 158, and the logical memory directory 134 includes at least one virtual logical memory file entry 160. It will be appreciated that remaining logical partition directories (e.g., for example, logical partition directory 124 and/or logical partition directory 126) may each also include the virtual processor directory 130, the I/O device directory 132, the logical memory directory 134, file entries associated therewith, and/or at least one virtual resource file entry 156, 158 and/or 160.

Figure 5:
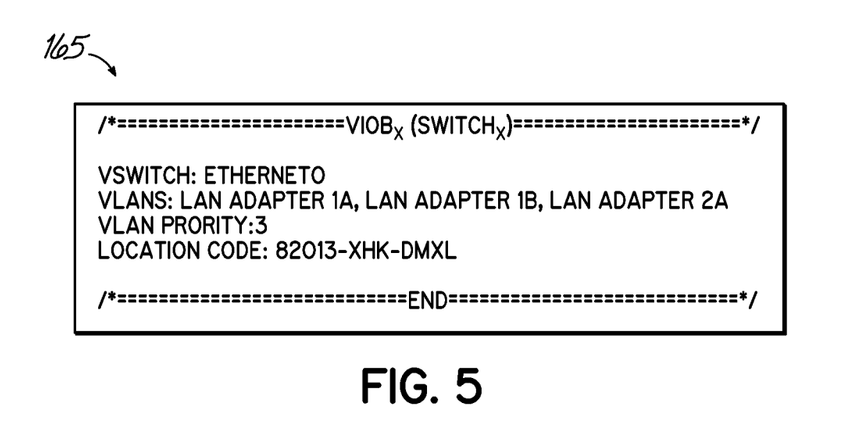
FIG. 5 is diagrammatic illustration of information that may be included in a file entry of the virtual file system of FIG. 4.

As discussed above, each virtual resource file entry 156, 158 and/or 160 is associated with the virtual resources of a logical partition. In specific embodiments, each virtual resource file entry 156, 158 and/or 160 may contain information about the configuration of the virtual resources of the logical partition in such a manner that the configuration can be modified by a user. FIG. 5 is a diagrammatic illustration 165 of at least a portion of a virtual resource file entry 156, 158 and/or 160, and in particular embodiments at least a portion of a virtual device file entry 158. As illustrated, the virtual resource file entry 156, 158, 160 may indicate the type of virtual device configured (e.g., a network switch) and include an indication of which physical resources, or portions thereof, are allocated to that virtual device (e.g., two portions of LAN Adapter 1, and a portion of LAN Adapter 2). Moreover, the virtual resource file entry 156, 158, 160 may include a priority (for example, a plurality of virtual device file entries 158 for a corresponding plurality of virtual switches may be configured across at least one logical partition, and the priority may indicate the priority of those plurality of virtual device file entries 158 associated with respective virtual switches) and indicate the location, including the logical partition, associated with that virtual resource file entry 156, 158, 160.

Managing Logically Partitioned Computers

Figure 6:
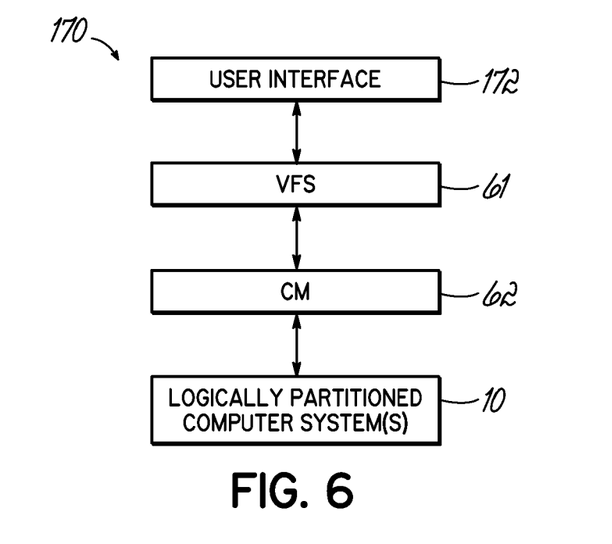
FIG. 6 is a diagrammatic illustration of the flow of information between a user interface, the virtual file system of FIG. 4, and the computing system of FIGS. 1-3.

FIG. 6 is a diagrammatic illustration 170 of communication between a user and logically partitioned computer consistent with embodiments of the invention. As illustrated in FIG. 6, at least one user interface 172 may communicate with at least one virtual file system 61 to manage the configuration of at least one logical partition. In turn, the virtual file system 61 may be managed by a CM 62, which may in turn manage the allocation of at least one logically partitioned computer 10. In some embodiments, the CM 62 maintains the virtual file system 61 for the user interface 172 to interact with, and in specific embodiments the CM 62 dynamically provides the virtual file system 61 to the user interface 172. As such, the user may interact with the virtual file system 61 through the user interface 172 to allocate resources to and/or from at least one logical partition of the at least one logically partitioned computer 10. In some embodiments, the user interface 172 includes a graphical user interface, a command line interface, and/or another interface which presents a file system representation to the user in the form of images, text, symbols and/or sounds. In specific embodiments, the user interface 172 is a file browser.

In some embodiments, the user interface 172 accepts operations, which may be in the form of keyboard strokes, mouse movements, combinations thereof, and/or other input signals generated by the actions of the user and performed on the virtual file system 61. In turn, the CM 62 translates the operations on the virtual file system 61 into partition management commands and may issue the partition management commands to the at least one logically partitioned computer 10. In specific embodiments, the CM 62 translates an operation into at least one partition management command configured to be executed by a virtualization manager, or hypervisor, of a target logical partition on a target logically partitioned computer 10. In some embodiments, and in response to the virtualization manager completing the partition management command, the CM 62 updates the virtual file system 61 such that the user interface 172 displays an updated representation reflecting the configuration of the logically partitioned computer 10.

Figure 7:
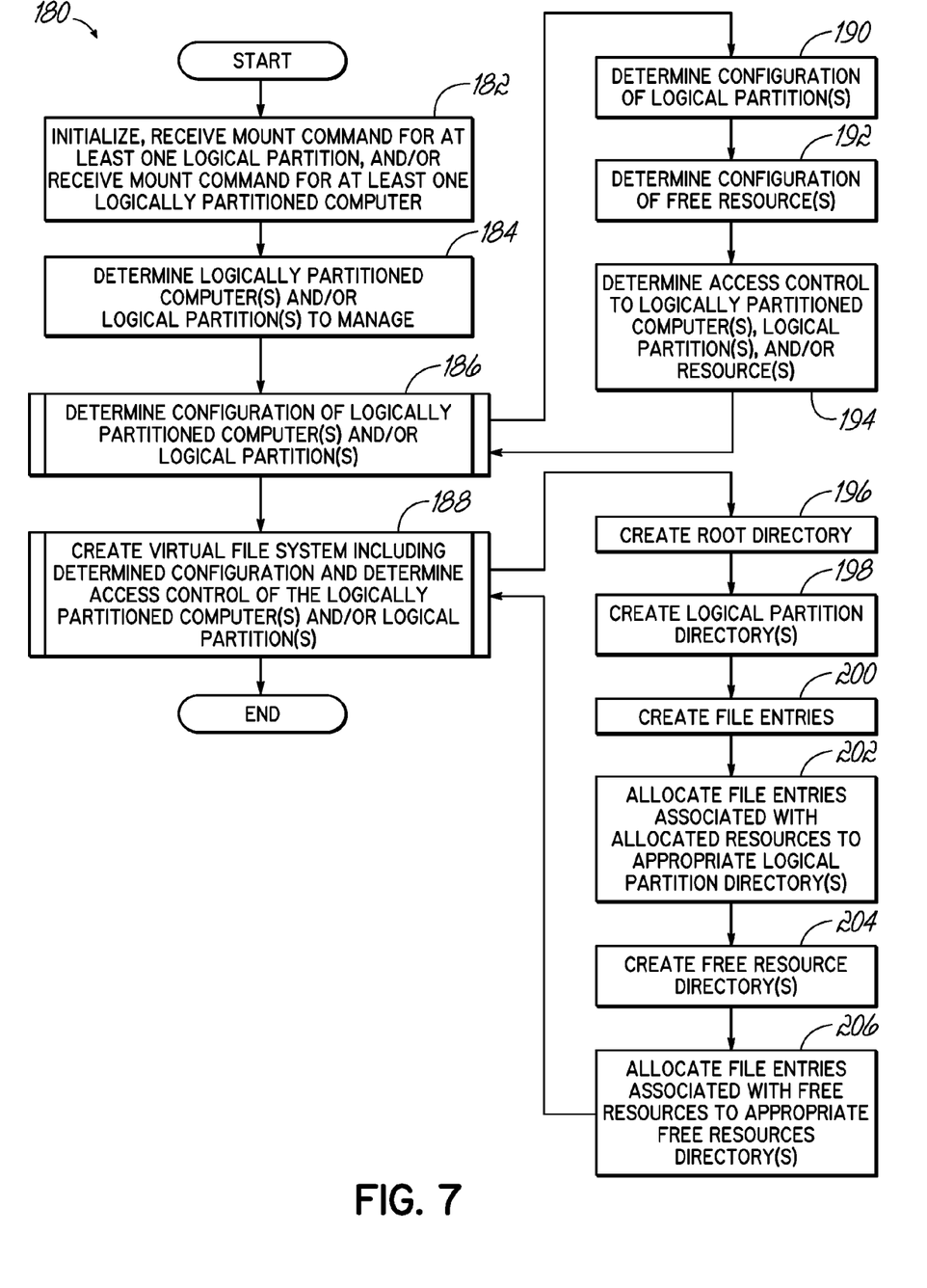
FIG. 7 is a flowchart illustrating the creation of the virtual file system of FIG. 4.

FIG. 7 is a flowchart illustrating a sequence of operations for program code to determine the configuration of a virtual file system consistent with embodiments of the invention. The program code may be configured in a configuration manager consistent with embodiments of the invention. In response to initialization of the computer upon which it is configured, in response to a mount command for at least one logical partition to mount that at least one logical partition into a virtual file system, and/or in response to a mount command for at least one logically partitioned computer to mount that at least one logically partitioned computer into a virtual file system (block 182), the program code may determine the at least one logically partitioned computer and/or the at least one logical partition to manage (block 184). The program code may determine the logically partitioned computer and/or logical partition based upon a configuration file, or based on user interaction with the configuration manager. Specifically, a user may provide a mount command that specifies a type of mounting (e.g., a logically partitioned computer or a logical partition), a username and password, and/or a location of the logically partitioned computer and/or logical partition. After determining the logically partitioned computer and/or logical partition to manage, the program code may determine the configuration of the logically partitioned computer and/or logical partition (block 186) and create a virtual file system that includes the determined configuration as well as determine access control rules for the determined configuration(s) (block 188).

Returning to block 186, the program code may perform a plurality of steps to determine the configuration of the at least one logically partitioned computer and/or the at least one logical partition. For example, at least one logically partitioned computer may be specified in block 184, and the program code may determine the configuration of at least one logical partition configured thereupon (block 190). Alternatively, at least one logical partition may be specified in block 184, and the program code may determine the configuration of that at least one logical partition (block 190). As such, the program code may determine the physical resources, such as physical processors, memory, and/or I/O devices, allocated to the at least one logical partition (block 190). Similarly, the program code may also determine the free resources allocable to the at least one logical partition (block 192). In some embodiments, the free resources allocable to the at least one logical partition include at least a portion of the free resources of the logically partitioned computer upon which the at least one logical partition is configured. The program code may also determine the access control to the at least one logically partitioned computer, the at least one logical partition, and/or the resources thereof (block 194). In various embodiments, the program code may determine the access control based upon an access control list or the program code may query a user as to which users are allowed to access and/or perform operations on the at least one logically partitioned computer, the at least one logical partition, and/or the resources thereof.

Returning to block 188, the program code may perform a plurality of steps to create the virtual file system. After determining the configuration of the at least one logically partitioned computer and/or the at least one logical partition, the program code may create a root directory associated with that logically partitioned computer and/or that logical partition (block 196) as well as create a logical partition directory for each at least one logical partition (block 198). Upon creation of a logical partition directory, the program code may automatically create default directories and/or file entries for that logical partition directory (block 200). The program code may create file entries associated with each resource allocated to a logical partition, each resource of a logically partitioned computer upon which that logical partition is configured, each free resource allocable to that logical partition, and/or each free resource of the logically partitioned computer upon which that logical partition is configured (block 200). After creating the file entries, the program code may allocate the file entries associated with allocated resources to the appropriate directories such that the allocated file entries correspond to the allocated resources of the at least one logical partition (block 202). For example, if a logical partition is configured with two physical processors, the program code may create LPB file entries associated with those physical processors and allocate those LPB file entries to a virtual processor directory for that logical partition consistent with embodiments of the invention. The program code may also create at least one free resource directory (block 204) and allocate file entries associated with free resources to the at least one free resource directory (block 206).

Figure 8:
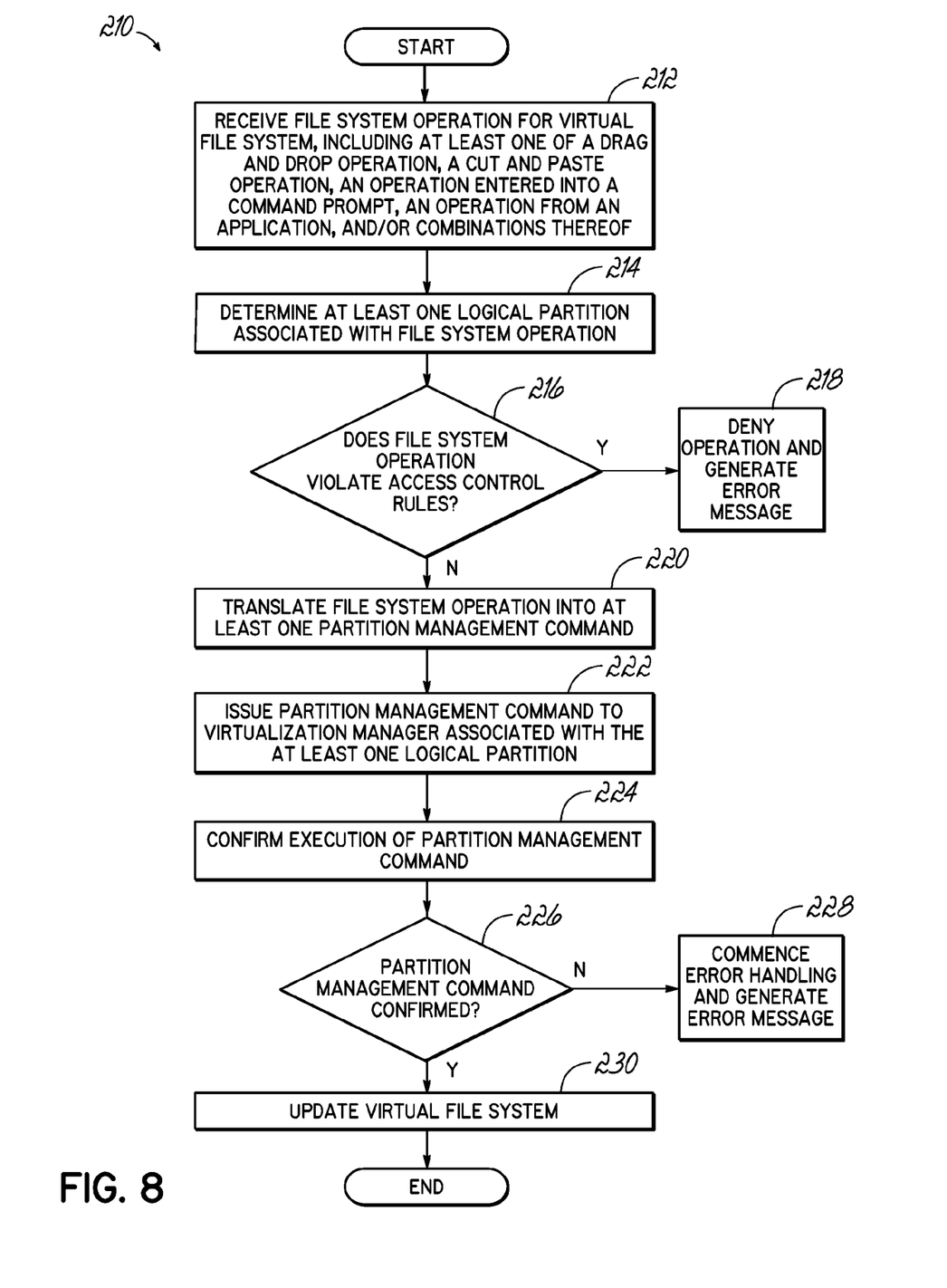
FIG. 8 is a flowchart illustrating the translation of a file system operation on the virtual file system of FIG. 4 into a partition management command.

FIG. 8 is a flowchart 210 illustrating a sequence of operations for program code to modify the allocation of resources to at least one logical partition in response to modification of the allocation of resources to a virtual file system associated with that at least one logical partition. The program code may be configured in a configuration manager consistent with embodiments of the invention. The program code initially receives a file system operation for a virtual file system (block 212) and determines at least one logical partition associated with the file system operation (block 214). In some embodiments, the file system operation received in block 212 may be from a file browser, a command prompt, an application, and/or another interface with the virtual file system. As such, the file system operation may include at least one of a drag and drop operation, a cut and paste operation, an operation entered into the command prompt, an operation from the application, and/or combinations thereof (block 212).

After determining the at least one logical partition associated with the file system operation, the program code may determine whether the file system operation violates access control rules in an access control list (block 216). In some embodiments, the program code is configured to selectively control access to operations on a directory for a first logical partition with an access control list associated with that directory. In specific embodiments, the program code is configured to determine the identity of a user attempting to perform an operation on the directory for the first logical partition and determine whether the user has access to perform that operation on the directory for the first logical partition. In alternative embodiments, the program code is configured to selectively control access to the directory for the first logical partition. In specific embodiments, the program code is configured to determine the identity of the user attempting to access the directory for the first logical partition and determine whether the user has access to the directory for the first logical partition. When the file system operation violates access control rules ("Yes" branch of block 216), the program code denies the file system operation and may generate an error message (block 218).

When the file system operation does not violate access control rules ("No" branch of block 216), the program code may translate the file system operation into at least one partition management command (block 220). In specific embodiments, the file system operation may reallocate at least one file entry to and/or from at least one file system directory associated with the at least one logical partition, and thus the program code may translate the file system operation into a partition management command to reallocate resources associated with the at least one file entry to and/or from the at least one logical partition (block 220). For example, the file system operation may be directed to the virtual file system to organize a respective file entry for a first partitionable resource within a respective directory for a first logical partition. As such, the file system operation may be translated into at least one partition management command to allocate a first partitionable resource associated with the respective file entry to the first logical partition. As such, the program code may issue the partition management command to the virtualization manager, or hypervisor, for the at least one logical partition (block 222).

After issuing the partition management command (block 222), the program code may confirm the execution of the partition management command (block 224). In some embodiments, the program code may issue the partition management command and then wait for a time period, then query the virtualization manager for the at least one logical partition to determine whether the partition management command has been executed. In alternative embodiments, the program code may be responsive to a confirmation signal from the virtualization manager for the at least one logical partition to confirm the execution of the partition management command. The program code may thus determine whether execution of the partition management command has been confirmed (block 226). When the execution of the partition management command has not been confirmed ("No" branch of decision block 226) the program code may commend error handling routines and generate an error message. When the execution of the partition management command has been confirmed ("Yes" branch of decision block 226) the program code may update the virtual file system appropriately (block 230).

Figure 9:
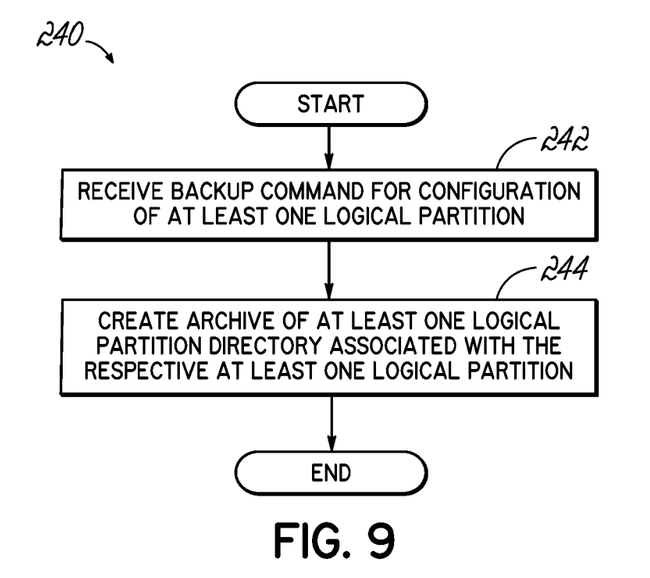
FIG. 9 is a flowchart illustrating the archival of the virtual file system of FIG. 4.

FIG. 9 is a flowchart 240 illustrating the operation of program code executable to backup the configuration of at least one logical partition. In particular, the program code may receive a backup command for the configuration of at least one logical partition (block 242) and, in response to that backup command, create an archive of each directory associated with that at least one logical partition (block 244). As such, the program code may not only archive the hierarchical layers of that directory, but also the file entries in each layer of that directory (block 244).

Advantageously, the use of a virtual file system allows an interface commonly presented to users to manage files in a file system be used to allocate resources in a logically partitioned computer system. Moreover, the use of a virtual file system allows easy retrieval of information. For example, searching for a particular file entry may allow the user to view the directory it is in, thus indicating the particular logical partition associated with that file entry. Moreover, the virtual file system allows archiving of at least one directory, or multiple directories, without querying logical partitions for their configuration.

Those skilled in the art will recognize that the environments illustrated in FIGS. 1-9 are not intended to limit the present invention. Various modifications may be made to the illustrated embodiments without departing from the spirit and scope of the invention. For example, it will be appreciated that a plurality of logicality partitioned computers may be managed by a single hypervisor, and as such logical partitions in a hierarchical representation of a virtual file system may be configured across the plurality of logically partitioned computers. To further elaborate, rather than a root directory of a virtual file system being associated with logical partitions configured on one logically partitioned computer, the root directory may be associated with logical partitions configured across a plurality of logically partitioned computers. To analogize, the directory for logical partition "A" in FIG. 4 may be associated with a first logical partition on a first logically partitioned computer, while the directory for logical partition "B" may be associated with a second logical partition on a second logically partitioned computer. Thus, and to further analogize, the directory for the resource pool may be associated with free resources on the first and/or second logically partitioned computer.

Moreover, it will be appreciated that the CM may be configured separate from the hypervisor, and in particular the CM may be configured in a separate logical partition (not shown). As such, the CM may be in communication with the hypervisor through a network and/or intra-partition communications.

As a further example, it will be appreciated that additional I/O devices may be included without departing from the scope of the invention. For example, although optical disks, LAN adapters, a tape drive, DASDs, and a control panel are illustrated in FIG. 2 and FIG. 3 (and their corresponding file entries are illustrated in FIG. 4), additional I/O devices may be included without departing from the scope of the invention. As such, and also for example, additional LIOB file entries associated with those additional I/O devices may be included without departing from the scope of the invention.

Thus, the invention in its broader aspects is therefore not limited to the specific details, representative apparatus and method shown and described. In particular, any of the blocks of the above flowcharts may be deleted, augmented, made to be simultaneous with another, combined, or be otherwise altered in accordance with the principles of the present invention. For example, although the blocks of FIGS. 7-9 are illustrated as being in a specific order, any of the blocks of FIGS. 7-9 may be combined, made concurrent, and/or re-ordered without departing from the scope of the invention. Accordingly, departures may be made from such details without departing from the spirit or scope of applicants' general inventive concept.

Other modifications will be apparent to one of ordinary skill in the art. Therefore, the invention lies in the claims hereinafter appended.

What is claimed is:

1. A method of managing partitionable resources in a logically partitioned computing system, the method comprising:
    associating each of a plurality of partitionable resources in the logically partitioned computing system with a respective file entry in a virtual file system, wherein the plurality of partitionable resources includes a first partitionable resource, and wherein the first partitionable resource comprises a partitionable processor resource;
    associating each of a plurality of logical partitions in the logically partitioned computing system with a respective directory in the virtual file system;
    allocating the first partitionable resource to a first logical partition among the plurality of logical partitions in response to a file system operation directed to the virtual file system to organize a respective file entry for the first partitionable resource within the respective directory for the first logical partition;
    wherein the plurality of partitionable resources comprises a plurality of partitionable processor resources and a plurality of partitionable memory resources, and wherein the respective directory of each logical partition includes a processor directory and a memory directory, the processor directory for each logical partition including a file entry for each partitionable processor resource allocated to such logical partition, and the memory directory for each logical partition including a file entry for each partitionable memory resource allocated to such logical partition.

2. The method of claim 1, further comprising:
    selectively controlling access to the directory for the first logical partition with an access control list associated with the directory for the first logical partition.

3. The method of claim 2, wherein selectively controlling access to the directory for the first logical partition further comprises:
   determining the identity of a user attempting to access the directory for the first logical partition; and
   determining whether the user has access to the directory for the first logical partition based on the access control list.

4. The method of claim 1, further comprising:
   selectively controlling access to an operation on the directory for the first logical partition with an access control list associated with the directory for the first logical partition.

5. The method of claim 4, wherein selectively controlling access to the operation on the directory for the first logical partition further comprises:
   determining the identity of a user attempting to perform the operation on the directory for the first logical partition; and
   determining whether the user has access to perform the operation on the directory for the first logical partition based on the access control list.

6. The method of claim 1, wherein the file system operation is at least one operation selected from the group consisting of a drag and drop operation, a cut and paste operation, an operation entered in a command prompt, an operation from an application, or combinations thereof.

7. The method of claim 1, further comprising:
   translating the file system operation into at least one partition management command configured to be executed by a virtualization manager for the first logical partition.

8. The method of claim 1, further comprising:
   archiving at least a portion of a configuration of the plurality of logical partitions in the logically partitioned computing system by copying at least the directory for the first logical partition from the virtual file system and storing said copy.

9. The method of claim 1, further comprising:
   generating the virtual file system in response to a mount command for at least one logical partition among the plurality of logical partitions; and
   generating at least one directory for the file entries of the plurality of partitionable resources in response to generating the virtual file system.

10. The method of claim 1, further comprising:
    generating the directory for the first logical partition in the virtual file system for the logically partitioned computing system in response to a mount command for the first logical partition.

11. The method of claim 10, further comprising:
    generating at least one virtual resource file entry in response to the creation of the directory for the first logical partition; and
    allocating the at least one virtual resource file entry to the directory for the first logical partition.

12. The method of claim 1, wherein the plurality of partitionable resources further comprises a plurality of partitionable input/output resources, and wherein the respective directory of each logical partition includes an input/output directory, the input/output directory for each logical partition including a file entry for each partitionable input/output resource allocated to such logical partition.

13. The method of claim 1, further comprising:
    allocating a free partitionable resource among the plurality of partitionable resources to a free partitionable resource pool of the logically partitioned computing system.

14. The method of claim 13, further comprising:
    allocating a respective file entry for the free partitionable resource to a respective directory for free partitionable resources, wherein the respective directory for free partitionable resources is arranged in a same layer in the virtual file system as the respective directory for each logical partition.

15. The method of claim 14, wherein the first partitionable resource is the free partitionable resource, and wherein the file system operation directed to the virtual file system to organize the file entry for the first partitionable resource within the directory for the first logical partition includes transferring the file entry for the first partitionable resource from the directory for free partitionable resources to the directory for the first logical partition.

16. The method of claim 1, wherein the virtual file system is provided to a first computing system in communication with the logically partitioned computing system.

17. An apparatus, comprising:
    at least one processor; and
    a memory including program code, the program code configured to be
    executed by the at least one processor to manage partitionable resources in a logically partitioned computing system by associating each of a plurality of partitionable resources in the logically partitioned computing system with a respective file entry in a virtual file system, wherein the plurality of partitionable resources includes a first partitionable resource, and wherein the first partitionable resource comprises a partitionable processor resource, associating each of a plurality of logical partitions in the logically partitioned computing system with a respective directory in the virtual file system, and allocating the first partitionable resource among the plurality of partitionable resources to a first logical partition among the plurality of logical partitions in response to a file system operation directed to the virtual file system to organize a respective file entry for the first partitionable resource within the respective directory for the first logical partition;
    wherein the plurality of partitionable resources comprises a plurality of partitionable processor resources and a plurality of partitionable memory resources, and wherein the respective directory of each logical partition includes a processor directory and a memory directory, the processor directory for each logical partition including a file entry for each partitionable processor resource allocated to such logical partition, and the memory directory for each logical partition including a file entry for each partitionable memory resource allocated to such logical partition.

18. The apparatus of claim 17, wherein the program code is further configured to selectively control access to the directory for the first logical partition with an access control list associated with the directory for the first logical partition.

19. The apparatus of claim 17, wherein the program code is further configured to selectively control access to an operation on the directory for the first logical partition with an access control list associated with the directory for the first logical partition.

20. The apparatus of claim 17, wherein the program code is further configured to translate the file system operation into at least one partition management command configured to be executed by a virtualization manager for the first logical partition.

21. The apparatus of claim 17, wherein the program code is further configured to archive at least a portion of a configuration of the plurality of logical partitions in the logically partitioned computing system by copying at least the directory for the first logical partition from the virtual file system and storing said copy.

22. The apparatus of claim 17, wherein the program code is further configured to allocate a first partitionable resource among the plurality of partitionable resources to the directory for the first logical partition and allocate a respective file entry for the first partitionable resource to the respective directory for the first logical partition.

23. The apparatus of claim 17, wherein the program code is further configured to allocate a free partitionable resource among the plurality of partitionable resources to a free partitionable resource pool of the logically partitioned computing system and allocate a respective file entry for the free partitionable resource to a respective directory for free partitionable resources.

24. A program product, comprising:
program code configured to be executed by at least one processor to manage partitionable resources in a logically partitioned computing system by associating each of a plurality of partitionable resources in the logically partitioned computing system with a respective file entry in a virtual file system, wherein the plurality of partitionable resources includes a first partitionable resource, and wherein the first partitionable resource comprises a partitionable processor resource, associating each of a plurality of logical partitions in the logically partitioned computing system with a respective directory in the virtual file system, and allocating the first partitionable resource among the plurality of partitionable resources to a first logical partition among the plurality of logical partitions in response to a file system operation directed to the virtual file system to organize a respective file entry for the first partitionable resource within the respective directory for the first logical partition;

a non-transitory computer recordable medium bearing the program code;

wherein the plurality of partitionable resources comprises a plurality of partitionable processor resources and a plurality of partitionable memory resources, and wherein the respective directory of each logical partition includes a processor directory and a memory directory, the processor directory for each logical partition including a file entry for each partitionable processor resource allocated to such logical partition, and the memory directory for each logical partition including a file entry for each partitionable memory resource allocated to such logical partition.

* * * * *